(12) United States Patent
Li

(10) Patent No.: US 12,156,145 B2
(45) Date of Patent: Nov. 26, 2024

(54) METHOD AND DEVICE FOR CONTROLLING TRANSMISSION POWER, AND STORAGE MEDIUM

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 317 days.

(21) Appl. No.: 17/774,406

(22) PCT Filed: Nov. 6, 2019

(86) PCT No.: PCT/CN2019/116009
§ 371 (c)(1),
(2) Date: May 4, 2022

(87) PCT Pub. No.: WO2021/087809
PCT Pub. Date: May 14, 2021

(65) Prior Publication Data
US 2022/0394625 A1    Dec. 8, 2022

(51) Int. Cl.
*H04W 52/24*    (2009.01)
(52) U.S. Cl.
CPC .................. *H04W 52/242* (2013.01)
(58) Field of Classification Search
CPC ............ H04W 52/242; H04W 52/325; H04W 52/383; H04W 52/146; Y02D 30/70
USPC ........................................................ 455/522
See application file for complete search history.

(56) References Cited

U.S. PATENT DOCUMENTS

| 2018/0132197 A1 | 5/2018 | Lin et al. |
| 2022/0110075 A1* | 4/2022 | Zhao ................ H04W 52/383 |

FOREIGN PATENT DOCUMENTS

| CN | 101350642 A | 1/2009 |
| CN | 101471705 A | 7/2009 |
| CN | 101990291 A | 3/2011 |
| WO | 2019151915 A1 | 8/2019 |

OTHER PUBLICATIONS

Extended European Search Report of EP Application No. 19952107.1 dated Oct. 17, 2022, (39p).
First OA for IN Application 202247031949 dated Sep. 15, 2022 with partial English translation, (5p).
Panasonic, "Discussion on physical layer procedures for sidelink in NR V2X", 3GPP TSG RAN WG1 #96bis, R1-1905382, Xi'an, China, Apr. 8-12, 2019, (5p).

(Continued)

*Primary Examiner* — Eugene Yun
(74) *Attorney, Agent, or Firm* — Arch & Lake LLP

(57) ABSTRACT

A method for controlling a transmission power, applicable to a first device, includes: determining a feedback sequence based on data from a second device, where the data is transmitted by the second device through Sidelink between the first device and the second device; determining a path loss between the first device and the second device based on a reception power and a transmission power of the data; and controlling a transmission power of the feedback sequence based on the path loss.

17 Claims, 4 Drawing Sheets

(56) References Cited

OTHER PUBLICATIONS

LG Electronics, "Feature lead summary for agenda item 7.2.4.1.2 Physical layer procedures", 3GPP TSG RAN WG1 #96, R1-1903367, Athens, Greece, Feb. 25-Mar. 1, 2019, (24p).
International Search Report of PCT Application No. PCT/CN2019/116009 dated Jul. 1, 2020 with English translation, (4p).
Oppo, "Physical Layer Procedure for NR-V2X Sidelink" 3GPP TSG RAN WG1 #98 bis, R1-1910375, Chongqing, China, Oct. 14-20, 2019, (12p).
Ericsson, "PHY Layer Procedures for NR Sidelink", 3GPP TSG-RAN WG1 Meeting #98bis, R1-1910538, Chongqing, China, Oct. 14-20, 2019, (14p).
Mediatek Inc., "Physical Layer Procedures For Sidelink", 3GPP TSG RAN WG1 #98bis, R1-1911070, Chongqing, China, Oct. 14-20, 2019, (16p).
The Office Action for EP Application No. 19952107.1 dated Mar. 26, 2024, (26p).
Huawei, HiSilicon: "Sidelink physical layer procedures for NR V2X," 3GPPTSG RAN WG1, Meeting #96, R1-1901537, Athens, Greece, Feb. 25-Mar. 1, 2019, (16p).

* cited by examiner

METHOD AND DEVICE FOR CONTROLLING TRANSMISSION POWER, AND STORAGE MEDIUM

CROSS-REFERENCE TO RELATED APPLICATION

This application is a U.S. national phase of International Application No. PCT/CN2019/116009, filed on Nov. 6, 2019, the entire content of which is incorporated herein by reference for all purposes.

TECHNICAL FIELD

The disclosure relates to the field of communication technologies, and in particular to a method and a device for controlling a transmission power, and a storage medium.

BACKGROUND

Vehicle to Everything (V2X), also known as Internet of Vehicles, is a new generation of information and communication technology that connects a vehicle with everything. V represents the vehicle and X represents any object that interacts with the vehicle such as another vehicle, people, traffic roadside infrastructure and a network.

In a V2X system, terminals can communicate directly with each other through Sidelink. Each terminal uses a maximum transmission power to transmit control information. One terminal can receive control information transmitted by multiple other terminals at the same time and the power of the received control information is different. Control information with a lower power may be overwhelmed by control information with a higher power. As a result, the control information with the low power may not be interpreted.

SUMMARY

According to a first aspect of the present disclosure, a method for controlling a transmission power is provided. The method is applicable to a first device. The method includes: determining a feedback sequence based on data from a second device, where the data is transmitted by the second device through Sidelink between the first device and the second device; determining a path loss between the first device and the second device based on a reception power and a transmission power of the data; and controlling a transmission power of the feedback sequence based on the path loss.

According to a second aspect of the present disclosure, a first device for controlling a transmission power is provided. The first device includes: a processor and a memory for storing instructions executable by the processor. The processor is configured to load and execute the instructions to perform the method for controlling a transmission power as described according to the first aspect.

According to a third aspect of the present disclosure, a computer-readable storage medium is provided. The computer-readable storage medium has stored therein instructions that, when executed by a processor of a first device, causes the first device to perform acts according to the method for controlling a transmission power as described in the first aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

In the related art, V2X information-interaction modes include Vehicle to Vehicle (V2V), Vehicle to Infrastructure (V2I), Vehicle to Pedestrian (V2P) and Vehicle to Network (V2N).

In the V2X system, a relative position of two parties participating in information interaction will change due to a fast moving speed of the vehicle, that is, a quality and length of a data transmission path will change, which leads to different path losses when transmitting data between different terminals and different path losses when transmitting data between the same two terminals at different times. If each terminal transmits data with the same transmission power, the corresponding reception power may be different when the same terminal receives data transmitted by multiple terminals at the same time. It may be able to parse data with a higher reception power, while data with a lower reception power may not be correctly parsed, which affects communication. Therefore, in embodiments of the disclosure, the transmission power of each terminal is controlled to adjust the power when the data transmitted by the terminal reaches the receiving terminal, reducing a possibility that the data with the lower reception power is overwhelmed by the data with the higher reception power and improving the communication quality.

Figure 1:
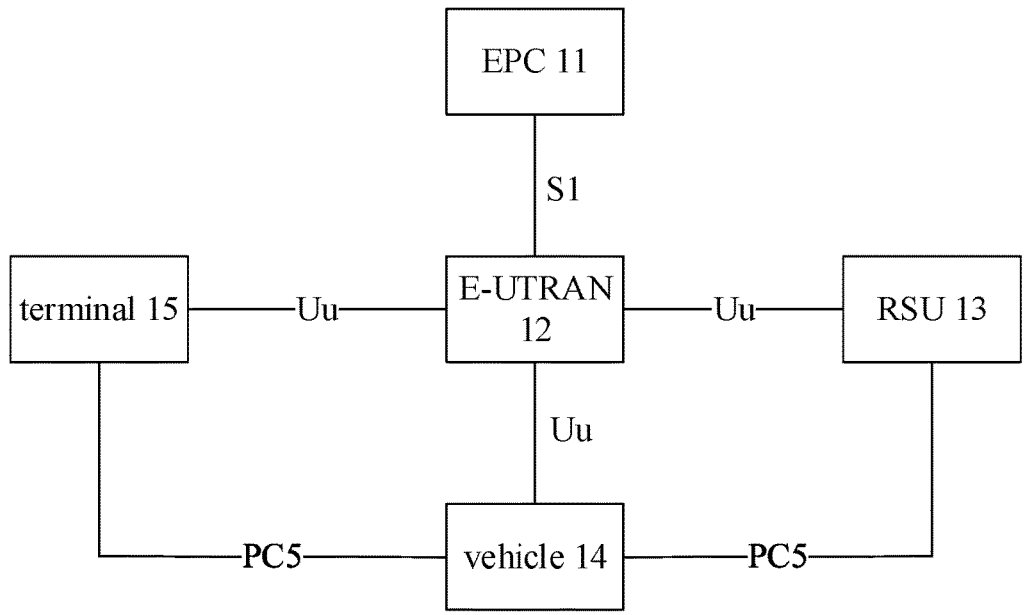
FIG. 1 is a schematic diagram of a network architecture, according to some embodiments of the disclosure.

FIG. 1 is a schematic diagram of a network architecture, according to some embodiments of the disclosure. The network architecture is only described by taking a long term evolution (LTE) system as an example. As illustrated in FIG.

1, the network architecture may include an evolved packet core (EPC) 11, an evolved universal mobile telecommunication system (UMTS) terrestrial radio access network (E-UTRAN) 12, a road side unit (RSU) 13, a vehicle 14 and a terminal 15.

The EPC 11 is a core network of the LTE system. The core network includes several core network devices. Functions of the core network devices are to provide user connections, user managements and bearing of services, as interfaces to external networks, provided by a bearing network. For example, the EPC 11 includes mobility management entity (MME), serving gateway (S-GW) and PDN gateway (P-GW). The E-UTRAN 12 is an access network of the LTE system. The access network includes several access network devices. The access network device may be a base station (BS), which is a device deployed in the access network to provide the terminal 15 with a wireless communication function. Base stations can include various forms of macro base stations, micro base stations, relay stations, access points and the like. In systems using different radio access technologies, names of devices with base station functions may be different. For example, in the LTE system, they are called eNodeB or eNB; in the 5G new radio (NR) system, they are called gNodeB or gNB.

The terminals 15 may include various handheld devices, vehicle-mounted devices, wearable devices and computing devices with wireless communication functions, other processing devices connected to wireless modems, as well as various forms of user equipment, mobile stations (MSs), terminal devices and the like. For ease of description, the devices mentioned above are collectively referred to as terminals. The access network device and the core network device communicate with each other through a certain air interface technology, such as an S1 interface. The access network device and the terminal 15 also communicate with each other through a certain air interface technology, such as a Uu interface.

The RSU 13 can include a microwave read-write device and a controller. The RSU 13 is configured to receive information reported by the vehicle 14 and transmit road traffic information to the vehicle 14. The RSU 13 has data storage and processing capabilities, which can quickly and accurately detect traffic information such as road conditions and driving, and process the traffic information before transmitting it to the vehicle 14. The RSU13 and the access network device can communicate with each other through a certain air interface technology, such as a Uu interface.

The vehicle 14 may be an autonomous vehicle or a non-autonomous vehicle. The vehicle 14 is equipped with a vehicle-mounted communication device. The vehicle 14 realizes communication with other vehicles, terminals 15 or other devices such as an RSU 13 through the vehicle-mounted communication device. The vehicle-mounted communication device may be a device integrated in a Telematics BOX (T-BOX) or a device separate from the vehicle. In addition, the vehicle-mounted communication device may be installed in the vehicle 14 before the vehicle 14 leaves the factory or may be installed in the vehicle 14 after the vehicle 14 leaves the factory. The vehicle-mounted communication device of the vehicle 14 and the terminal 15 can communicate with each other through a direct communication interface (such as a PC5 interface). For example, the terminal 15 transmits its own location information to the vehicle 14 through the PC5 interface. The vehicle-mounted communication device of the vehicle 14 and the RSU 13 can communicate with each other through a direct communication interface (such as a PC5 interface). For example, the RSU 13 transmits traffic information of a distant road to the vehicle 14 through the PC5 interface. In addition, the vehicle-mounted communication device of the vehicle 14 and the access network device (for example, the eNB of the LTE system) may also communicate with each other through a certain air interface technology, such as a Uu interface.

The communication system in FIG. 1 can implement a V2X service scenario. The above communication system may also include devices such as a V2X application server and a V2X control function node, which are not limited in embodiments of the disclosure.

It should be noted that, in the communication system in FIG. 1, only the LTE system is taken as an example for description. The technical solutions described in the disclosure can be applied to the LTE system or other wireless communication systems that use various wireless access technologies, such as code division multiple access (CDMA), frequency division multiple access (FDMA), time division multiple access (TDMA), orthogonal frequency division multiple access (OFDMA), single carrier frequency division multiple access (SC-FDMA) and other access technology systems. In addition, it can also be applied to subsequent evolution systems of the LTE system, such as the next-generation network system, that is, the fifth generation (5G) system. In addition, in embodiments of the disclosure, the terms "network" and "system" are often used interchangeably, but those of ordinary skill in the art can understand their meaning.

The communication system and service scenario described in embodiments of the disclosure are intended to more clearly illustrate the technical solutions provided in embodiments of the disclosure but do not constitute a limitation to the technical solutions provided in embodiments of the disclosure. Those of ordinary skill in the art will know that the technical solutions provided in embodiments of the disclosure are equally applicable to similar technical problems as the communication system evolved and the new service scenario emerged.

Figure 2:
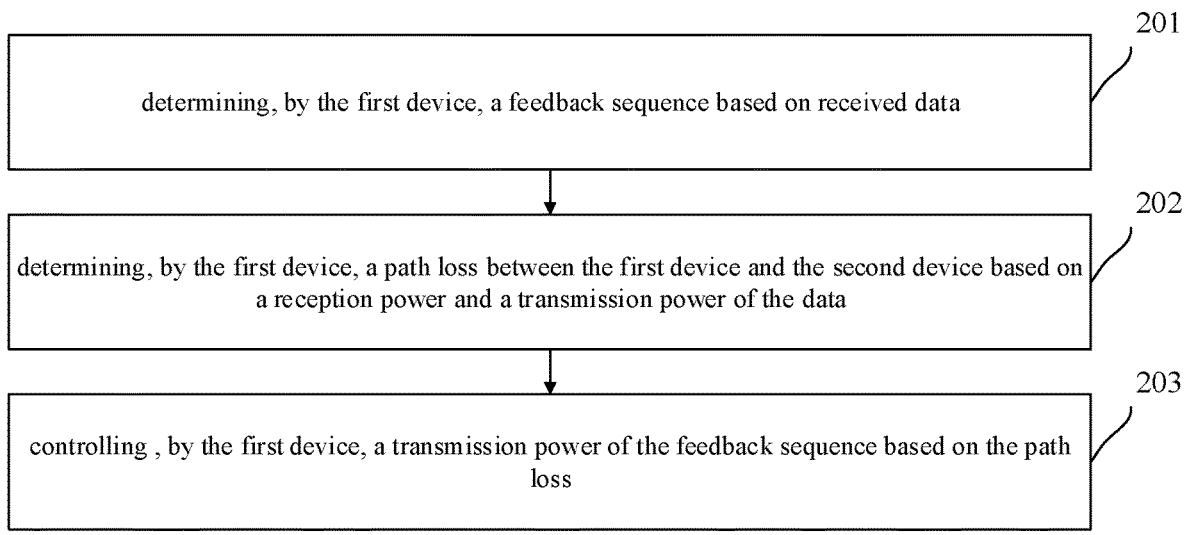
FIG. 2 is a flow chart illustrating a method for controlling a transmission power, according to some embodiments of the disclosure.

FIG. 2 is a flow chart illustrating a method for controlling a transmission power, according to some embodiments of the disclosure. The method may be executed by a first device. For example, the first device may be the terminal, the RSU or the vehicle-mounted communication device in the vehicle, in FIG. 1. Referring to FIG. 2, the method includes the following.

In 201, the first device determines a feedback sequence based on received data.

The data is transmitted by a second device through Sidelink.

In 202, the first device determines a path loss between the first device and the second device based on a reception power and a transmission power of the data.

In 203, the first device controls a transmission power of the feedback sequence based on the path loss.

In embodiments of the disclosure, the path loss when the first device and the second device transmit the data is determined based on the reception power and the transmission power of the received data and the transmission power of transmitting the feedback sequence by the first device is determined based on the path loss, thereby controlling the power when the feedback sequence reaches the second device, reducing a situation that the feedback sequence is overwhelmed by a feedback sequence transmitted by another device because the corresponding power is too low when the feedback sequence reaches the second device, and improving the communication quality.

Alternatively, determining the path loss between the first device and the second device based on the reception power and the transmission power of the data, includes: receiving broadcast information from the second device, in which the broadcast information carries transmission power indication information; and determining the transmission power of the data based on the transmission power indication information; and determining the path loss based on the reception power and the transmission power of the data.

Alternatively, the broadcast information is transmitted through a control channel or a broadcast channel.

Alternatively, controlling the transmission power of the feedback sequence based on the path loss, includes: determining a power compensation value based on a relative-motion speed of the first device and the second device and a time difference, in which the time difference is a difference between a time when the first device receives the data and a time when the first device transmits the feedback sequence; determining the transmission power based on the path loss, the power compensation value and a pre-configured target reception power; and transmitting the feedback sequence based on the determined transmission power.

Alternatively, the method further includes: determining a Doppler frequency offset based on a pilot sequence on a data channel carrying the data; and determining the relative-motion speed based on the Doppler frequency offset.

Alternatively, determining the relative-motion speed based on the Doppler frequency offset, includes: determining the relative-motion speed based on the Doppler frequency offset, a carrier frequency for transmitting the data and an angle between the first device and the second device for transmitting the data, in which the angle is an angle between a transmission path of the data and a connection line between the first device and the second device or is randomly selected from [−90 degree, 90 degree] with endpoint values included.

Alternatively, determining the power compensation value based on the relative-motion speed of the first device and the second device and the time difference, includes: determining a distance change value between a transmitting end and a receiving end based on the relative-motion speed and the time difference; and determining the power compensation value based on the distance change value.

Alternatively, determining the transmission power based on the path loss, the power compensation value and a pre-configured target reception power, includes: taking a sum of the path loss, the power compensation value and the pre-configured target reception power as the transmission power.

It is noted that the aforementioned 201-203 and the aforementioned alternative actions can be combined arbitrarily.

Figure 3:
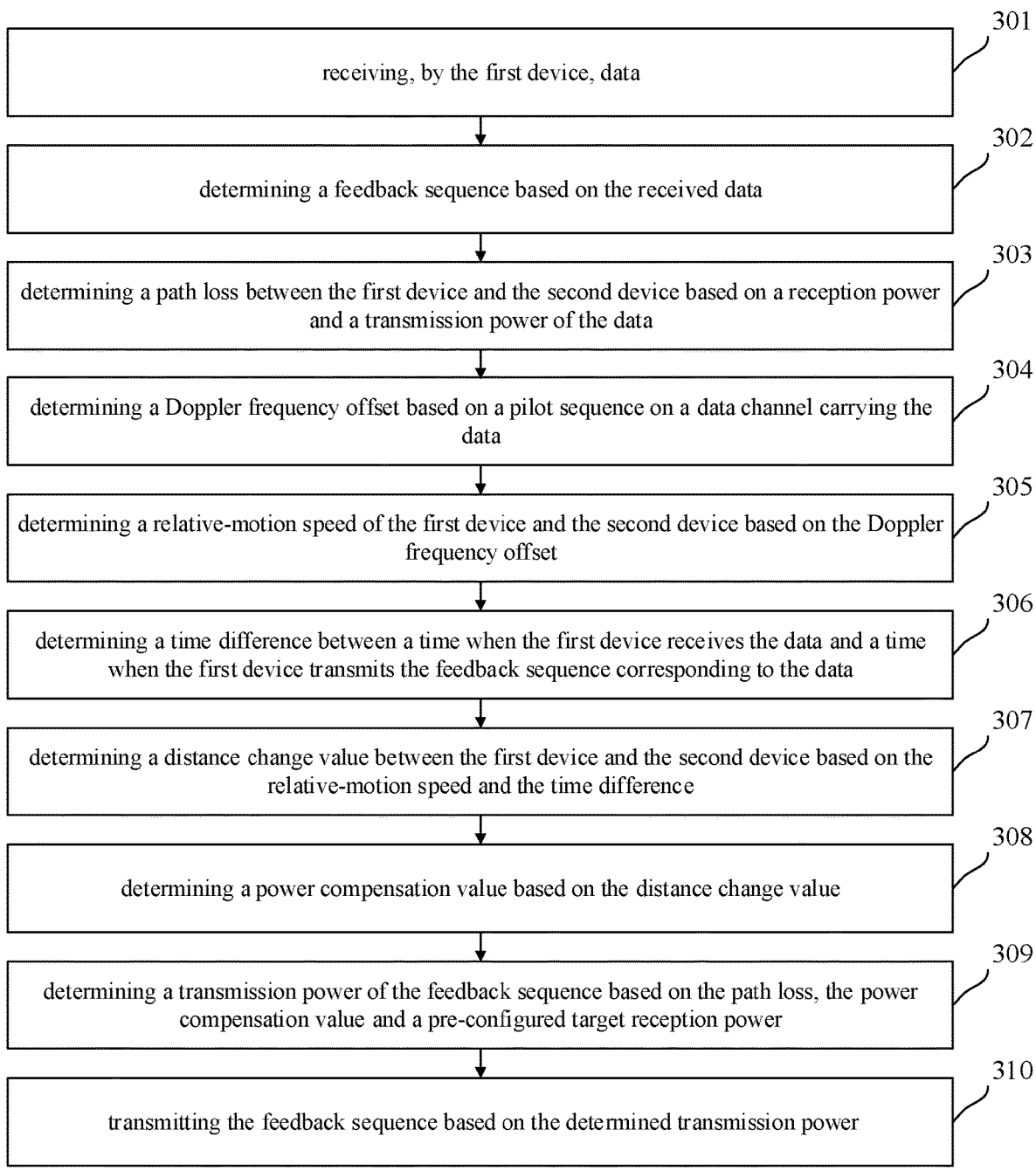
FIG. 3 is a flow chart illustrating a method for controlling a transmission power, according to some embodiments of the disclosure.

FIG. 3 is a flow chart illustrating a method for controlling a transmission power, according to some embodiments of the disclosure. The method may be executed by a first device. For example, the first device may be the terminal, the RSU or the vehicle-mounted communication device in the vehicle, in FIG. 1. Referring to FIG. 3, the method includes the following.

In 301, the first device receives data.

The data is transmitted by a second device through Sidelink between the first device and the second device. Sidelink is established by the first device and the second device based on the aforementioned direct communication interface.

For example, the received data is data carried on a data channel.

In 302, the first device determines a feedback sequence based on the received data.

In this 302, the first device determines whether feedback is required based on the received data; if the feedback is required, it determines feedback information, in which the feedback information includes an acknowledgement (ACK) or a negative acknowledgement (NACK); and it determines the feedback sequence based on the feedback information.

Alternatively, if the first device correctly receives the data transmitted by the second device, the feedback information is an acknowledgement; or if the first device does not correctly receive the data transmitted by the second device, the feedback information is a negative acknowledgement.

For example, when determining the feedback sequence based on the feedback information, physical uplink control channel (PUCCH) format 0 in the NR system can be used.

PUCCH format 0 carries 1-2 bits of control information (herein, the feedback information). During transmission, all 12 subcarriers of 1 resource block (RB) are occupied in the frequency domain and 1-2 orthogonal frequency division multiplexing (OFDM) symbols are occupied in the time domain. It carries the feedback information through sequence selection, that is, n-bit feedback information can be carried through $2^n$ candidate sequences.

In the NR, to improve resource utilization efficiency, these $2^n$ candidate sequences are generated based on different cyclic shift values of a computer-generated sequence of length 12 (i.e., a base sequence). The different cyclic shifts of the computer-generated sequence of length 12 are orthogonal, which means that different transmitting device (that is, the aforementioned first device) can select the desired cyclic shift from the $2^n$ candidate sequences according to the feedback information to be transmitted and multiplex the same RB. The receiving device (that is, the aforementioned second device) detects the sequence transmitted by the transmitting device from the candidate sequences and can determine the feedback information transmitted by the transmitting device.

That is, 302 may include: determining a cyclic shift based on the feedback information; and generating the feedback sequence to be transmitted based on the cyclic shift and the base sequence.

In 303, the first device determines a path loss between the first device and the second device based on a reception power and a transmission power of the data.

303 may include that: the first step is to receive broadcast information transmitted by the second device, in which the broadcast information carries transmission power indication information; the second step is to determine the transmission power of the data based on the transmission power indication information; and the third step is to determine the path loss based on the transmission power and the reception power.

In this third step, the path loss is equal to a difference between the transmission power and the reception power.

Alternatively, the broadcast information is transmitted through a control channel (i.e., broadcast control channel (BCCH)) or through a broadcast channel (i.e., broadcast channel (BCH)).

In 304, a Doppler frequency offset is determined based on a pilot sequence on a data channel carrying the data.

A difference between transmitting and receiving frequencies caused by the Doppler effect is called the Doppler frequency offset, also known as Doppler frequency shift.

In this 304, Doppler frequency offset estimation may be performed based on the pilot sequence to obtain the Doppler frequency offset. For example, the pilot sequence may be a pseudo-noise (PN) sequence and the autocorrelation characteristic of the PN sequence may be used to estimate the Doppler frequency offset. Embodiments of the disclosure do not limit the specific manner of Doppler frequency offset estimation and any one of related technologies can be used for implementation.

In 305, a relative-motion speed of the first device and the second device is determined based on the Doppler frequency offset.

In this 305, the relative-motion speed can be determined based on the Doppler frequency offset, a carrier frequency for transmitting the data and an angle between the first device and the second device for transmitting the data.

Alternatively, the angle is an angle between a transmission path of the data and a connection line between the first device and the second device or is randomly selected from [−90 degree, 90 degree] with endpoint values included.

For example, when the angle is the angle between the transmission path of the data and the connection line between the first device and the second device, it can be determined based on physical locations of the first device and the second device (such as latitude and longitude coordinates) and a receiving angle of an antenna.

For example, when the relative-motion speed of the first device and the second device is relatively fast, the angle may be an angle randomly selected from [−90 degree, 90 degree] with endpoint values included; and when the relative-motion speed of the first device and the second device is relatively slow, the angle may be an angle between the transmission path of the data and the connection line between the first device and the second device.

Alternatively, when the relative-motion speed is determined for the first time, the angle may be determined in a randomly selected manner, and then it is determined in which manner the angle is determined based on the relative-motion speed and the speed threshold.

In other embodiments, one of the manners may be arbitrarily selected to determine the angle.

For example, the relative-motion speed can be determined by the following formula (1):

$$CFO = \frac{v}{f} \times c \times \cos\theta \quad (1)$$

where in the formula (1), CFO is the Doppler frequency offset, v is the relative-motion speed, f is the carrier frequency for current transmission, c is the speed of light and θ is the aforementioned angle. CFO is obtained through 305. f, c, and θ are known. Therefore, the relative-motion speed can be determined by the formula (1).

In 306, a time difference between a time when the first device receives the data and a time when the first device transmits the feedback sequence corresponding to the data is determined.

After the first device receives the data, it takes a certain amount of time to determine whether the feedback is required, determine the feedback information and determine the feedback sequence corresponding to the type of the feedback information. In addition, after the feedback sequence is determined, it needs to be transmitted on the assigned symbol, which also needs to wait for a certain amount of time. Therefore, there is the time difference between the time when the first device receives the data and the time when the feedback sequence corresponding to the data is transmitted.

For example, the time difference may be pre-configured. For example, the time when the data is received is known and the time when the feedback sequence is transmitted (such as the time slot and the symbol) is configured. Therefore, the time difference between the two can be determined.

In 307, a distance change value between the first device and the second device is determined based on the relative-motion speed and the time difference.

In this 307, a product of the relative-motion speed and the time difference is the distance change value between the first device and the second device. The distance change value is a distance change in a time period between the time when the first device receives the data and the time when the first device transmits the feedback sequence.

In 308, a power compensation value is determined based on the distance change value.

In a possible implementation manner, the power compensation value may be determined based on the distance change value and a path loss model. That is, the distance change value is substituted into the path loss model to determine the power compensation value, and the power compensation value is configured to represent a path loss corresponding to when a distance between the first device and the second device changes by the distance change value.

For example, the path loss model may be any path loss model in related technologies, including but not limited to Manhattan model, free space propagation model, Hata model, which can be selected according to actual needs.

Through 307 and 308, the power compensation value can be determined based on the relative-motion speed of the first device and the second device and the time difference.

In 309, a transmission power of the feedback sequence is determined based on the path loss, the power compensation value and a pre-configured target reception power.

In this 309, a sum of the path loss, the power compensation value and the pre-configured target reception power can be used as the transmission power of the feedback sequence.

The target reception power is pre-configured and can be defined by the standard. Alternatively, all devices can use the same target reception power. Or, the target reception power can also correspond to types of the transmitter and the receiver of the feedback sequence, that is, it can correspond to types of the first device and/or the second device.

Since the first device and/or the second device are continuously moving, the relative position between the first device and the second device will change after the time period corresponding to the time difference has elapsed. Therefore, the path loss after transmitting the feedback sequence is not exactly the same as the path loss of transmitting the received data and a certain amount of compensation is required for the path loss of transmitting the data. Generally, the path loss is related to the distance between the transmitting and receiving parties of the data. Therefore, the power compensation value can be determined based on the distance change first, and then the path loss change that may occur within the time difference is determined based on the calculated power compensation value.

In addition, the sum of the path loss, the power compensation value and the target reception power can be used as the transmission power of the feedback sequence. Therefore, when feedback sequences transmitted by multiple first devices reaches the second device, the power is all within a certain range above and below the target reception power. That is, the power when feedback sequences transmitted by multiple first devices reach the second device is equivalent, so that the second device can correctly determine the feedback information of each first device.

In another possible implementation manner, if the relative-motion speed of the first device and the second device is slow, for example, when the relative-motion speed of the first device and the second device is less than the speed threshold, the power compensation value may not be considered and the transmission power of the feedback sequence is determined directly based on the path loss and the pre-configured target reception power. In some embodiments, there is no need to perform 304 to 308.

In 310, the feedback sequence is transmitted based on the determined transmission power.

In this 310, the feedback sequence may be carried on a physical sidelink feedback channel (PSFCH).

Through 307 to 310, the transmission power of the feedback sequence can be controlled according to the path loss.

In embodiments of the disclosure, the path loss when the first device and the second device transmit the data is determined based on the reception power and the transmission power of the received data and the transmission power of transmitting the feedback sequence by the first device is determined based on the path loss, thereby controlling the power when the feedback sequence reaches the second device, reducing a situation that the feedback sequence is overwhelmed by a feedback sequence transmitted by another device because the corresponding power is too low when the feedback sequence reaches the second device, and improving the communication quality.

Figure 4:
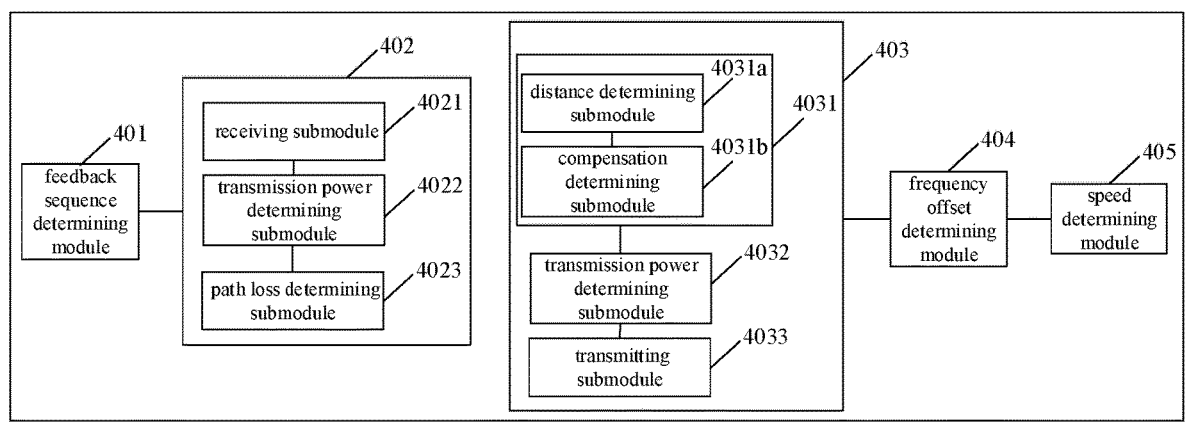
FIG. 4 is a block diagram illustrating an apparatus for controlling a transmission power, according to some embodiments of the disclosure.

FIG. 4 is a block diagram illustrating an apparatus for controlling a transmission power, according to some embodiments of the disclosure. The apparatus has the function of realizing the first device in the above method embodiments and the function can be realized by hardware or by hardware executing corresponding software. As illustrated in FIG. 4, the apparatus includes a feedback sequence determining module 401, a path loss determining module 402 and a transmission power controlling module 403. The feedback sequence determining module 401 is configured to determine a feedback sequence based on received data, the data being transmitted by a second device through Sidelink between the first device and the second device. The path loss determining module 402 is configured to determine a path loss between the first device and the second device based on a reception power and a transmission power of the data. The transmission power controlling module 403 is configured to control a transmission power of the feedback sequence based on the path loss.

Alternatively, the path loss determining module 402 includes: a receiving submodule 4021, configured to receive broadcast information from the second device, wherein the broadcast information carries transmission power indication information; and a transmission power determining submodule 4022, configured to determine the transmission power of the data based on the transmission power indication information; and a path loss determining submodule 4023, configured to determine the path loss based on the reception power and the transmission power of the data.

Alternatively, the broadcast information is transmitted through a control channel or a broadcast channel.

Alternatively, the transmission power controlling module 403, includes: a compensation determining submodule 4031, configured to determine a power compensation value based on a relative-motion speed of the first device and the second device and a time difference, wherein the time difference is a difference between a time when the first device receives the data and a time when the first device transmits the feedback sequence; a transmission power determining submodule 4032, configured to determine the transmission power based on the path loss, the power compensation value and a pre-configured target reception power; and a transmitting submodule 4033, configured to transmit the feedback sequence based on the determined transmission power.

Alternatively, the apparatus further includes: a frequency offset determining module 404, configured to determine a Doppler frequency offset based on a pilot sequence on a data channel carrying the data; and a speed determining module 405, configured to determine the relative-motion speed based on the Doppler frequency offset.

Alternatively, the speed determining module 405 is configured to determine the relative-motion speed based on the Doppler frequency offset, a carrier frequency for transmitting the data and an angle between the first device and the second device for transmitting the data, wherein the angle is an angle between a transmission path of the data and a connection line between the first device and the second device or is randomly selected from [−90 degree, 90 degree] with endpoint values included.

Alternatively, the compensation determining submodule 4031, includes: a distance determining submodule 4031a, configured to determine a distance change value between a transmitting end and a receiving end based on the relative-motion speed and the time difference; and a compensation determining submodule 4031b, configured to determine the power compensation value based on the distance change value.

Alternatively, the transmission power determining submodule 4032 is configured to take a sum of the path loss, the power compensation value and the pre-configured target reception power as the transmission power.

In embodiments of the disclosure, the path loss when the first device and the second device transmit the data is determined based on the reception power and the transmission power of the received data and the transmission power of transmitting the feedback sequence by the first device is determined based on the path loss, thereby controlling the power when the feedback sequence reaches the second device, reducing a situation that the feedback sequence is overwhelmed by a feedback sequence transmitted by another device because the corresponding power is too low when the feedback sequence reaches the second device, and improving the communication quality.

With respect to the apparatuses in the above embodiments, the specific manners for performing operations for individual modules therein have been described in detail in the embodiments regarding the methods, which will not be elaborated herein.

Figure 5:
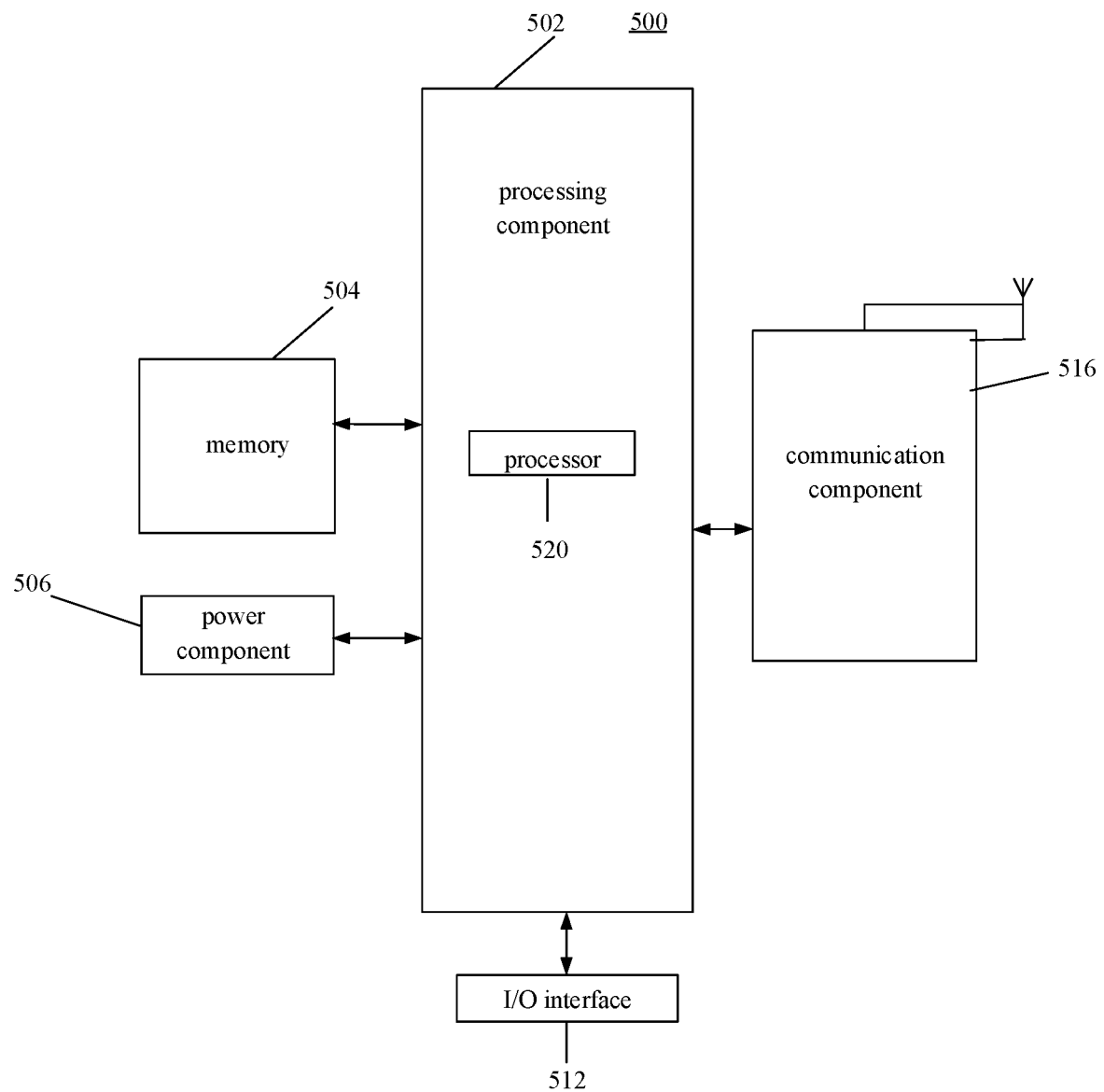
FIG. 5 is a block diagram illustrating a device for controlling a transmission power, according to some embodiments of the disclosure.

FIG. 5 is a block diagram illustrating a device 500 for controlling a transmission power, according to some embodiments of the disclosure. The device 500 can be any above first device. Referring to FIG. 5, the device 500 may include one or more of the following components: a processing component 502, a memory 504, a power component 506, an input/output (I/O) interface 512 and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the actions in the above described methods. Moreover, the processing component 502 may include one or more modules which facilitate the interaction between the processing component 502 and other components. For instance, the processing component 502 may include a multimedia module to facilitate the interaction between the multimedia component 505 and the processing component 502.

The memory 504 is configured to store various types of data to support the operation of the device 500. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The communication component 516 is configured to facilitate communication, wired or wirelessly, between the device 500 and other devices. The device 500 can access a wireless network based on a communication standard, such as 2G, 3G, 4G or 5G, or a combination thereof.

In some embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 504, executable by the processor 520 in the device 500, for performing the above-described methods. For example, the non-transitory computer-readable storage medium may be a ROM, a RAM, a CD-ROM, a magnetic tape, a floppy disc, an optical data storage device, and the like.

Some embodiments of the disclosure further provide a communication system. The communication system includes the above first device and second device.

The technical solutions provided in embodiments of the disclosure include at least the following beneficial effects. The path loss when the first device and the second device transmit the data is determined based on the reception power and the transmission power of the received data and the transmission power of transmitting the feedback sequence by the first device is determined based on the path loss, thereby controlling the power when the feedback sequence reaches the second device, reducing a situation that the feedback sequence is overwhelmed by a feedback sequence transmitted by another device because the corresponding power is too low when the feedback sequence reaches the second device, and improving the communication quality.

Other embodiments of the disclosure will be apparent to Those of ordinary skill in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling a transmission power, comprising:
   determining, by a first device, a feedback sequence based on data from a second device, wherein the data is transmitted by the second device through Sidelink between the first device and the second device;
   determining, by the first device, a path loss between the first device and the second device based on a reception power and a transmission power of the data; and
   controlling, by the first device, a transmission power of the feedback sequence based on the path loss;
   wherein, controlling the transmission power of the feedback sequence based on the path loss, comprises:
   determining a power compensation value based on a relative-motion speed of the first device and the second device and a time difference, wherein the time difference is a difference between a time when the first device receives the data and a time when the first device transmits the feedback sequence;
   determining the transmission power based on the path loss, the power compensation value and a pre-configured target reception power; and
   transmitting the feedback sequence based on the determined transmission power.

2. The method as claimed in claim 1, wherein, determining the path loss between the first device and the second device based on the reception power and the transmission power of the data, comprises:
   receiving broadcast information from the second device, wherein the broadcast information carries transmission power indication information; and
   determining the transmission power of the data based on the transmission power indication information; and
   determining the path loss based on the reception power and the transmission power of the data.

3. The method as claimed in claim 2, wherein, the broadcast information is transmitted through a control channel or a broadcast channel.

4. The method as claimed in claim 1, further comprising:
   determining a Doppler frequency offset based on a pilot sequence on a data channel carrying the data; and
   determining the relative-motion speed based on the Doppler frequency offset.

5. The method as claimed in claim 4, wherein, determining the relative-motion speed based on the Doppler frequency offset, comprises:
   determining the relative-motion speed based on the Doppler frequency offset, a carrier frequency for transmitting the data and an angle between the first device and the second device for transmitting the data, wherein the angle is one of following angles: an angle between a transmission path of the data and a connection line between the first device and the second device or an angle randomly selected from [−90 degree, 90 degree] with endpoint values included.

6. The method as claimed in claim 1, wherein, determining the power compensation value based on the relative-motion speed of the first device and the second device and the time difference, comprises:
 determining a distance change value between the first device and the second device based on the relative-motion speed and the time difference; and
 determining the power compensation value based on the distance change value.

7. The method as claimed in claim 1, wherein, determining the transmission power based on the path loss, the power compensation value and the pre-configured target reception power, comprises:
 taking a sum of the path loss, the power compensation value and the pre-configured target reception power as the transmission power.

8. A first device for controlling a transmission power, comprising:
 a processor; and
 a memory for storing instructions executable by the processor;
 wherein the processor is configured to load and execute the instructions to perform acts comprising:
 determining a feedback sequence based on data from a second device, wherein the data is transmitted by the second device through Sidelink between the first device and the second device;
 determining a path loss between the first device and the second device based on a reception power and a transmission power of the data; and
 controlling a transmission power of the feedback sequence based on the path loss;
 wherein, controlling the transmission power of the feedback sequence based on the path loss, comprises:
 determining a power compensation value based on a relative-motion speed of the first device and the second device and a time difference, wherein the time difference is a difference between a time when the first device receives the data and a time when the first device transmits the feedback sequence;
 determining the transmission power based on the path loss, the power compensation value and a pre-configured target reception power; and
 transmitting the feedback sequence based on the determined transmission power.

9. The first device as claimed in claim 8, wherein the processor is configured to load and execute the instructions to perform acts further comprising:
 receiving broadcast information from the second device, wherein the broadcast information carries transmission power indication information; and
 determining the transmission power of the data based on the transmission power indication information; and
 determining the path loss based on the reception power and the transmission power of the data.

10. The first device as claimed in claim 8, wherein the processor is configured to load and execute the instructions to perform acts further comprising:
 determining a Doppler frequency offset based on a pilot sequence on a data channel carrying the data; and
 determining the relative-motion speed based on the Doppler frequency offset.

11. The first device as claimed in claim 10, wherein the processor is configured to load and execute the instructions to perform acts further comprising:
 determining the relative-motion speed based on the Doppler frequency offset, a carrier frequency for transmitting the data and an angle between the first device and the second device for transmitting the data, wherein the angle is one of following angles: an angle between a transmission path of the data and a connection line between the first device and the second device or an angle randomly selected from [−90 degree, 90 degree] with endpoint values included.

12. The first device as claimed in claim 8, wherein the processor is configured to load and execute the instructions to perform acts further comprising:
 determining a distance change value between the first device and the second device based on the relative-motion speed and the time difference; and
 determining the power compensation value based on the distance change value.

13. The first device as claimed in claim 8, wherein the processor is configured to load and execute the instructions to perform acts further comprising:
 taking a sum of the path loss, the power compensation value and the pre-configured target reception power as the transmission power.

14. A non-transitory computer-readable storage medium having stored therein instructions that, when executed by a processor of a first device, causes the first device to perform acts comprising:
 determining a feedback sequence based on data from a second device, wherein the data is transmitted by the second device through Sidelink between the first device and the second device;
 determining a path loss between the first device and the second device based on a reception power and a transmission power of the data; and
 controlling a transmission power of the feedback sequence based on the path loss;
 wherein, controlling the transmission power of the feedback sequence based on the path loss, comprises:
 determining a power compensation value based on a relative-motion speed of the first device and the second device and a time difference, wherein the time difference is a difference between a time when the first device receives the data and a time when the first device transmits the feedback sequence;
 determining the transmission power based on the path loss, the power compensation value and a pre-configured target reception power; and
 transmitting the feedback sequence based on the determined transmission power.

15. The non-transitory computer-readable storage medium as claimed in claim 14, wherein, determining the path loss between the first device and the second device based on the reception power and the transmission power of the data, comprises:
 receiving broadcast information from the second device, wherein the broadcast information carries transmission power indication information; and
 determining the transmission power of the data based on the transmission power indication information; and
 determining the path loss based on the reception power and the transmission power of the data.

16. The non-transitory computer-readable storage medium as claimed in claim 14, wherein the instructions cause the first device to perform acts further comprising:

determining a Doppler frequency offset based on a pilot sequence on a data channel carrying the data; and determining the relative-motion speed based on the Doppler frequency offset.

17. The non-transitory computer-readable storage medium as claimed in claim 16, wherein, determining the relative-motion speed based on the Doppler frequency offset, comprises:

determining the relative-motion speed based on the Doppler frequency offset, a carrier frequency for transmitting the data and an angle between the first device and the second device for transmitting the data, wherein the angle is one of following angles: an angle between a transmission path of the data and a connection line between the first device and the second device or an angle randomly selected from [−90 degree, 90 degree] with endpoint values included.

* * * * *